(12) United States Patent  
Coppens

(10) Patent No.: US 8,924,149 B2  
(45) Date of Patent: Dec. 30, 2014

(54) OUTDOOR TO INDOOR NAVIGATION SYSTEM

(75) Inventor: Sven Coppens, Gentbrugge (BE)

(73) Assignee: TomTom Belgium N.V., Gent (BE)

( * ) Notice: Subject to any disclaimer, the term of this patent is extended or adjusted under 35 U.S.C. 154(b) by 619 days.

(21) Appl. No.: 13/203,497

(22) PCT Filed: Mar. 8, 2010

(86) PCT No.: PCT/EP2010/052915
§ 371 (c)(1),
(2), (4) Date: Aug. 26, 2011

(87) PCT Pub. No.: WO2010/105934
PCT Pub. Date: Sep. 23, 2010

(65) Prior Publication Data
US 2012/0016578 A1    Jan. 19, 2012

Related U.S. Application Data

(60) Provisional application No. 61/202,585, filed on Mar. 16, 2009.

(51) Int. Cl.
*G06F 19/00*    (2011.01)

(52) U.S. Cl.
USPC ............ 701/438; 701/426; 701/439; 345/738

(58) Field of Classification Search
USPC .......................... 701/438, 426, 439; 345/738
See application file for complete search history.

(56) References Cited

U.S. PATENT DOCUMENTS

| | | | |
|---|---|---|---|
| 7,353,110 B2 * | 4/2008 | Kim .............................. | 701/438 |
| 7,720,596 B2 * | 5/2010 | Kobuya et al. ............... | 701/426 |
| 7,979,204 B2 * | 7/2011 | Kobuya et al. ............... | 701/439 |
| 8,401,785 B2 * | 3/2013 | Cho et al. ...................... | 701/426 |
| 2002/0133292 A1 | 9/2002 | Miyaki | |
| 2003/0069694 A1 | 4/2003 | Fuchs et al. | |
| 2009/0157313 A1 | 6/2009 | Lee | |

FOREIGN PATENT DOCUMENTS

| | | |
|---|---|---|
| EP | 1726971 | 11/2006 |
| JP | 2008292454 | 12/2008 |
| WO | 9957575 | 11/1999 |

OTHER PUBLICATIONS

International Search Report issued on May 7, 2010 for International Application No. PCT/EP2010/052915.

(Continued)

*Primary Examiner* — Ronnie Mancho

(57) ABSTRACT

An outdoor-to-indoor (and vise versa) navigation system guides a traveler (30) to an interior point of interest (POI, 28) inside a three-dimensional structure (16) using a navigation device (10). When the traveler (30) reaches the destination (16) address, a 3D model of the destination object (16) is rendered on a display screen (12) and subsequent navigation assistance is rendered in relation to attributed features associated with the 3D model. Initial directional cues (33) associated with the 3D model guide the traveler (30) in relation to externally discernable POIs and toward an exterior portal POI (24). When the current position of the navigation device (10) generally coincides with the exterior portal POI (24), a set of final directional cues (35) are rendered which lead the traveler (30) in relation to internally discernable POIs to an interior feature POI (28). 3D navigation attributes may be associated with various POIs and used in the 3D portion of the navigation routing program.

17 Claims, 10 Drawing Sheets

(56) References Cited

OTHER PUBLICATIONS

XP010843059 Bruntrup R et al: "Incremental map generation with GPS traces" Intelligent Transportation Systems, 2005. Proceedings. 2005 IEEE Vienna, Austria Sep. 13-16, 2005, Piscataway, NJ, USA,IEEE Lnkd-001: 10. 1109/ITSC.2005.1520084, Sep. 13, 2005.

* cited by examiner

OUTDOOR TO INDOOR NAVIGATION SYSTEM

CROSS REFERENCE TO RELATED APPLICATIONS

This application is the National Stage of International Application No. PCT/EP2010/052915, filed Mar. 8, 2010 and designating the United States. The entire content of this application is incorporated herein by reference.

This application claims priority from U.S. provisional application 61/202,585, filed 16 Mar. 2009. The entire content of this application is incorporated herein by reference.

BACKGROUND OF THE INVENTION

1. Field of the Invention

A navigation system for guiding a traveler along a determined route in a digital map to a point of interest, and more particularly guiding a traveler from an outdoor location to a specific location inside a building structure.

2. Related Art

It is now a common practice for travelers to obtain route guidance and navigation assistance using a portable navigation device having position determining capabilities, such as those enabled by GPS functionality. A personal navigation device, like that shown at 10 for example in FIG. 1, may be configured to utilize digital maps for route planning and navigation purposes. The navigation system 10 includes, typically, a display screen 12 or suitable graphic user interface that portrays a network of road segments 14 along with directional cues that lead a traveler to some selected destination. For the sake of clarity, it is to be understood that the term "road" as used here refers broadly to geometry supporting all kinds of transportation—including not only motorized vehicle traffic, but also bicycle, pedestrian, etc. When configured as a portable device with position determining capabilities, the navigation device 10 can be correlated to the digital map and its current position displayed on or referenced in images portrayed on the display screen 12. Examples of such devices include in-car navigation systems, hand-held navigation systems, appropriately equipped PDAs, some cell phones, and the like. Alternatively, the navigation device 10 may not have position determining capabilities, as is the case with most computer terminals, and as such used for route planning purposes but not real-time navigation.

Such navigation devices 10 are well known for their ability to plan a route between two locations in a digital map. For example, as shown in FIG. 2, a traveler may enter a destination address 16 and the navigation device 10 will plan a route from its current position or a starting point of origin 18 using appropriate cost-determining algorithms.

Interest in three-dimensional (3D) rendering in connection with navigation devices 10 is growing in the marketplace. Sometimes, it is preferable to provide route planning and navigation visuals in a 2D, so-called bird's eye view mode and then display 3D images as the destination 16 is approached. The 3D images are thought to aide a traveler in navigation by providing visual references corresponding to structures visible in real life. Examples of prior art teaching 3D objects rendered as a traveler approaches their destination may be found in, for example, US Publication No. 2009/0157313 to Lee, published Jun. 18, 2009, US Publication No. 2004/0015292 to Wiio et al., published Jan. 22, 2004, US Publication No. 2009/0171581 to Ushida et al., published Jul. 2, 2009, and US Publication No. 2009/0082960 to Ramaswami et al., published Mar. 26, 2009.

Interest in 3D modeling in connection with navigation services has also been directed toward building interiors, such as shown in U.S. Pat. No. 6,728,636 to Kokojima et al., issued Apr. 27, 2004. This Kokojima patent teaches a system and method for guiding a traveler to various points of interest within a building, for example leading a traveler to a ticket counter inside a railway station.

While these various prior art teachings exist in isolation, there is in fact no effective way known in the art to guide a traveler from an outdoor point of origin to an interior or indoor destination point using combinations of 2D and 3D imaging and directional cues. Rather, the prior art systems are capable only of guiding a traveler to a particular building address and announcing that the destination has been reached. This may also be accompanied by a 3D model rendering of the building or other physical object for the benefit of the traveler, however, current navigation systems are incapable of directing the traveler to a particular entrance and then inside the building to a destination point of interest which, in the previously offered example of a railway station, may comprise the ticket counter.

Accordingly, there is a need in the art to provide a method and navigation system for guiding travelers from an outdoor point of origin to an indoor destination using effective combinations of 2D and 3D renderings with directional cues. Furthermore, there is a need to provide navigation assistance that can be more easily understood in practice by incorporating available visual references and directional cues more closely modeled after human-to-human interactions.

SUMMARY OF THE INVENTION

This invention relates to methods and techniques for guiding a traveler along a predetermined route in a digital map to a point of interest (POI) with respect to a three-dimensional structure in real life. A digitized 3D model is provided that corresponds to a physical object in reality having an address. A digital map is also provided having stored therein at least one road segment corresponding to a road in reality that leads to the address of the physical object. A plurality of spatially distinct points of interest (POIs) are associated with the 3D model which correspond to distinct locations distributed about the physical object in real life. A personal navigation device interacts with the digital map and has a display screen. A traveler selects one of the plurality of POIs as a destination. The navigation device provides directional cues associated with a 2D representation of the road segment to lead the traveler to the address of the physical object. Then, upon reaching the destination address, proximate the physical object, a 3D model of the physical object is portrayed on the display screen, with directional cues associated with the 3D model leading toward the selected POI.

In another embodiment of the invention, wherein the navigation device is portable and has position determining capabilities, and wherein the point of interest is an interior point inside the three-dimensional structure, the spatially distinct points of interest (POIs) associated with the 3D model include at least one POI comprising an exterior portal and at least one POI comprising an interior feature. When the selected POI is an interior feature POI, an initial set of directional cues associated with the 3D model direct the traveler toward the exterior portal POI. Then, when the current position of the position reading device generally coincides with the external portal POI, final directional cues are provided to lead the traveler toward the interior feature POI which is the selected destination. Accordingly, the system appropriately guides the traveler through the correct entrance portal prior to leading the traveler to their selected interior point of interest.

This invention, therefore, provides an enabling method by which a traveler may select any sufficiently attributed object on or in the 3D model as a destination. As a result, through the principles of this invention, navigation assistance is shared between a digital map navigation portion and a 3D model navigation portion. The digital map navigation portion carries the traveler 30 along the road networks 14 until the destination address is reached, and then the 3D model navigation portion takes over to direct the travel to a specific location with respect to the 3D model.

The subject invention provides a link between known systems of outdoor and indoor navigation, enabling the navigation of travelers from outdoor based points of origin to interior points within a 3D rendering of a building or other physical object.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 3:
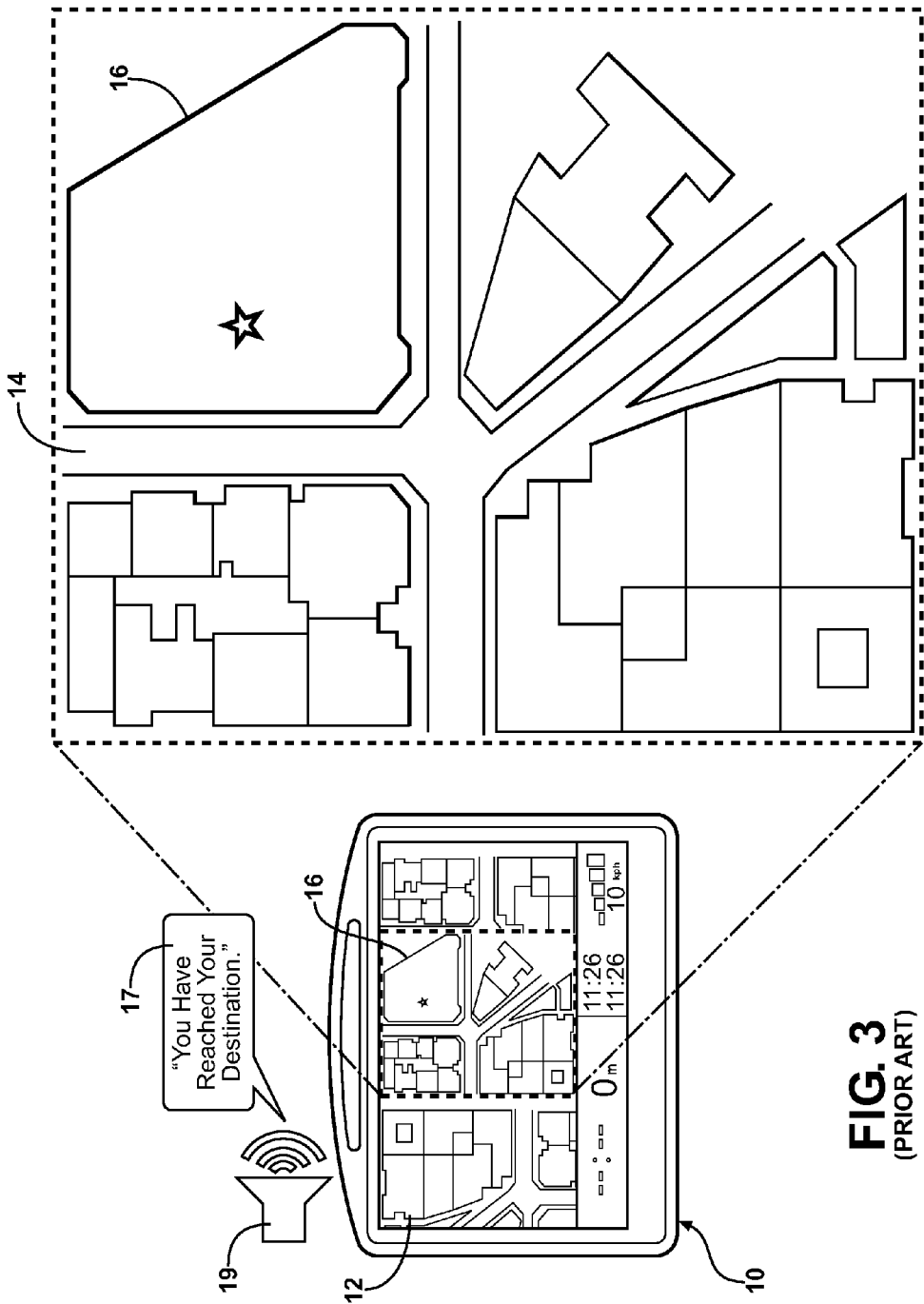
FIG. 3 is a view of an exemplary navigation system according to the prior art which announces an arrival upon reaching the address location of its destination.
Figure 4:
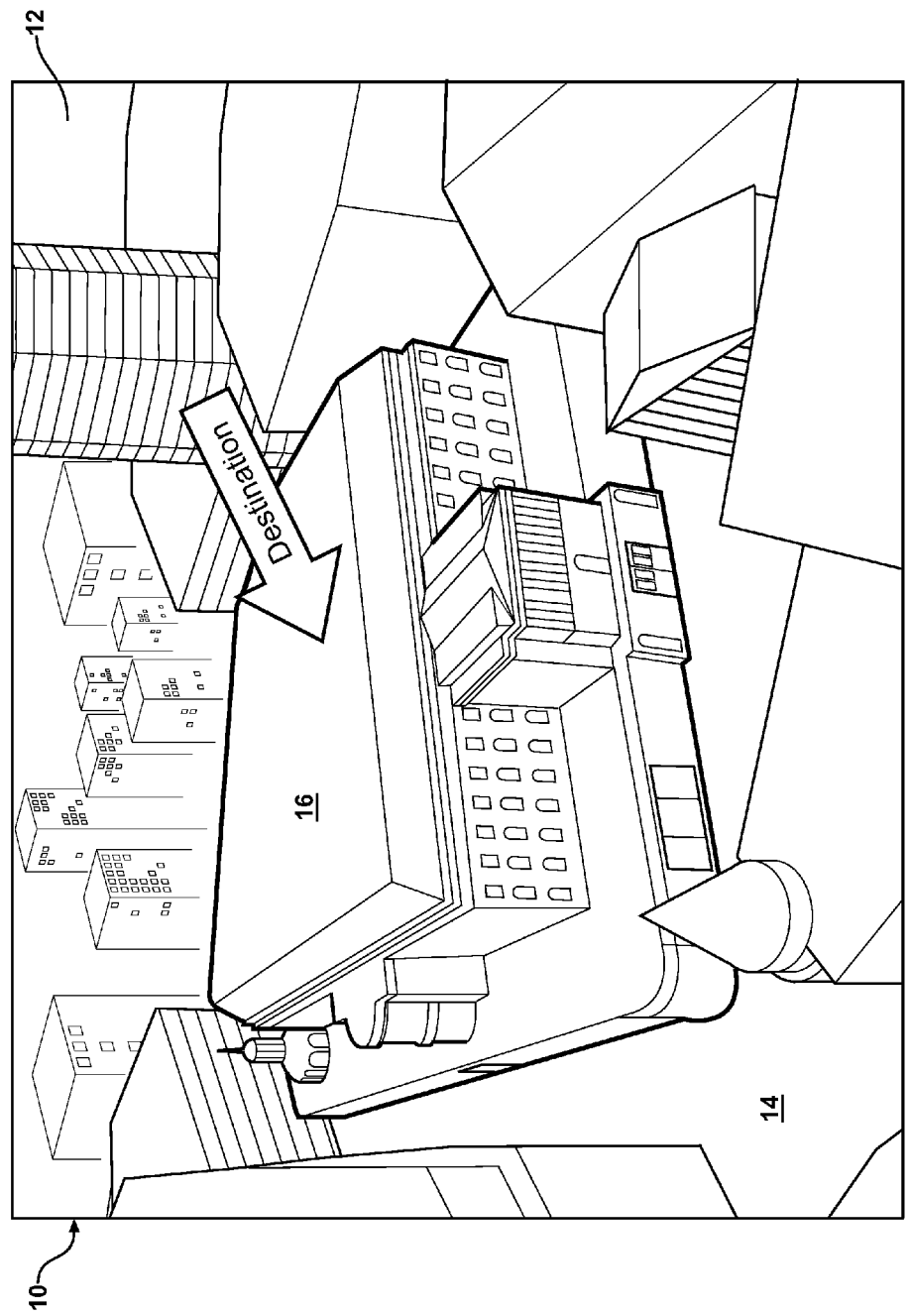
FIG. 4 is an enlarged view of a display screen of a navigation device which, according to prior art techniques, may display a 3D model of the destination address.

Referring to the figures wherein like numerals indicate like or corresponding parts throughout the several views, FIG. 3 depicts a typical scenario as may occur using prior art navigation systems in which a navigation device 10 leads a traveler to a particular street address and then announces that the traveler has reached their destination 16. Again, for the sake of clarity, it is to be understood that the term "road" or "street" refers in the broadest sense to any geometry that supports transportation—including motorized vehicle traffic, bicycle traffic, pedestrian traffic, and the like. This announcement may occur in writing, with symbols on the display screen 12 or via audible announcement 17 through a speaker 19 integrated into the navigation device 10. FIG. 4 shows another prior art situation in which a 3D model of the destination address 16 is rendered on the display screen 12, but no further information is given as to a particular point of interest located in or around the destination address 16 which may be the traveler's ultimate destination, and no ability is provided to select a particular feature of the 3D model as the ultimate destination.

This invention, therefore, provides an enabling method by which a traveler may select any sufficiently attributed object on or in the 3D model (e.g., a door, a store, a counter, etc.) as a destination, instead of merely an address or POI whose position (x,y,z) is recorded in a digital (2D) map. As a result, through the principles of this invention, navigation is carried quite literally to a doorstep, i.e., to the ultimate destination, by transitioning between digital map (2D) navigation and 3D model navigation, with the destination address serving as the reference or transition point between 2D and 3D navigation. Thus, the invention contemplates dividing navigation assistance into a digital map navigation portion and a 3D model navigation portion. The digital map navigation portion carries the traveler along the road networks 14 until the destination address is reached, and then the 3D model navigation portion takes over to direct the travel to a specific location with respect to the 3D model.

Figure 5:
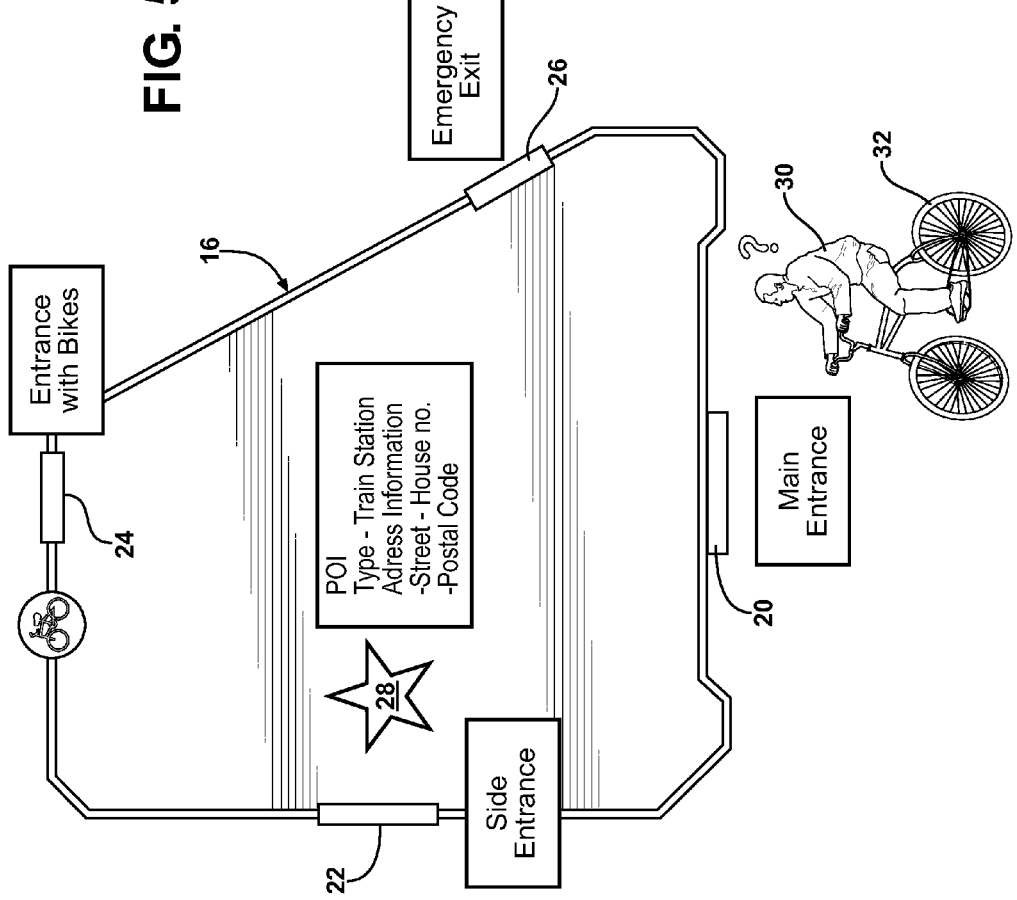
FIG. 5 is a simplified illustration showing the distress a traveler may encounter having arrived at a destination address but without clear instructions how to navigate further toward a specific interior location within the building.

FIG. 5 shows the destination address 16 rendered as a 3D model as in FIG. 4, but in this exemplary case identifies five attributed points of interest (POIs) comprising four exterior portals and one interior feature. Each POI is established as a feature in a 3D model of the address 16. The exterior portals comprise a main entrance 20, a side entrance 22, a rear entrance 24 and an emergency exit 26 identified in the 3D model. The interior POI 28 in this example corresponds to a ticket counter in the 3D model, but of course there may be many interior POIs specified in the 3D model from which a traveler can select as a final destination. A 3D model of the destination building 16 is stored in the digital map used by the navigation device 10. 3D navigation attributes are added to the digital map and associated with the 3D model. These 3D navigation attributes correspond to points of interest (POIs) which are considered likely destination points, visual navigation aides, and/or junctures in a navigation route leading to an ultimate destination. The 3D navigation attributes may include any meta-information useful for navigation purposes. For example, the exterior portal POIs 20-26 may include meta-data to position (x, y, z), entrance type which, for example, may include the fact that rear entrance 24 permits bicycle passage or that portal 26 is used for emergency exits only. Other metadata information may include handicapped accessibility as well as other useful pieces of information. Interior feature POIs may include navigation attributes such as POI type (e.g., ticket counter) as well as position information and other pertinent details.

Figure 1:
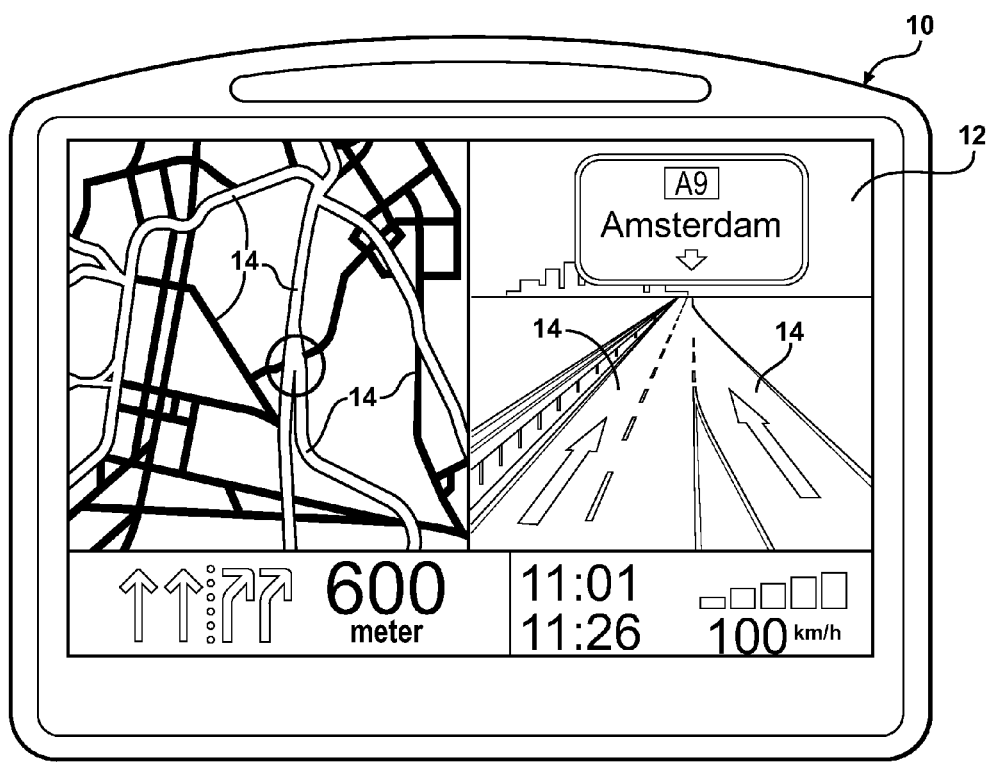
FIG. 1 is an exemplary view of a portable navigation device according to one embodiment of this invention including a display screen for presenting map data information in both 2D and 3D formats.
Figure 2:
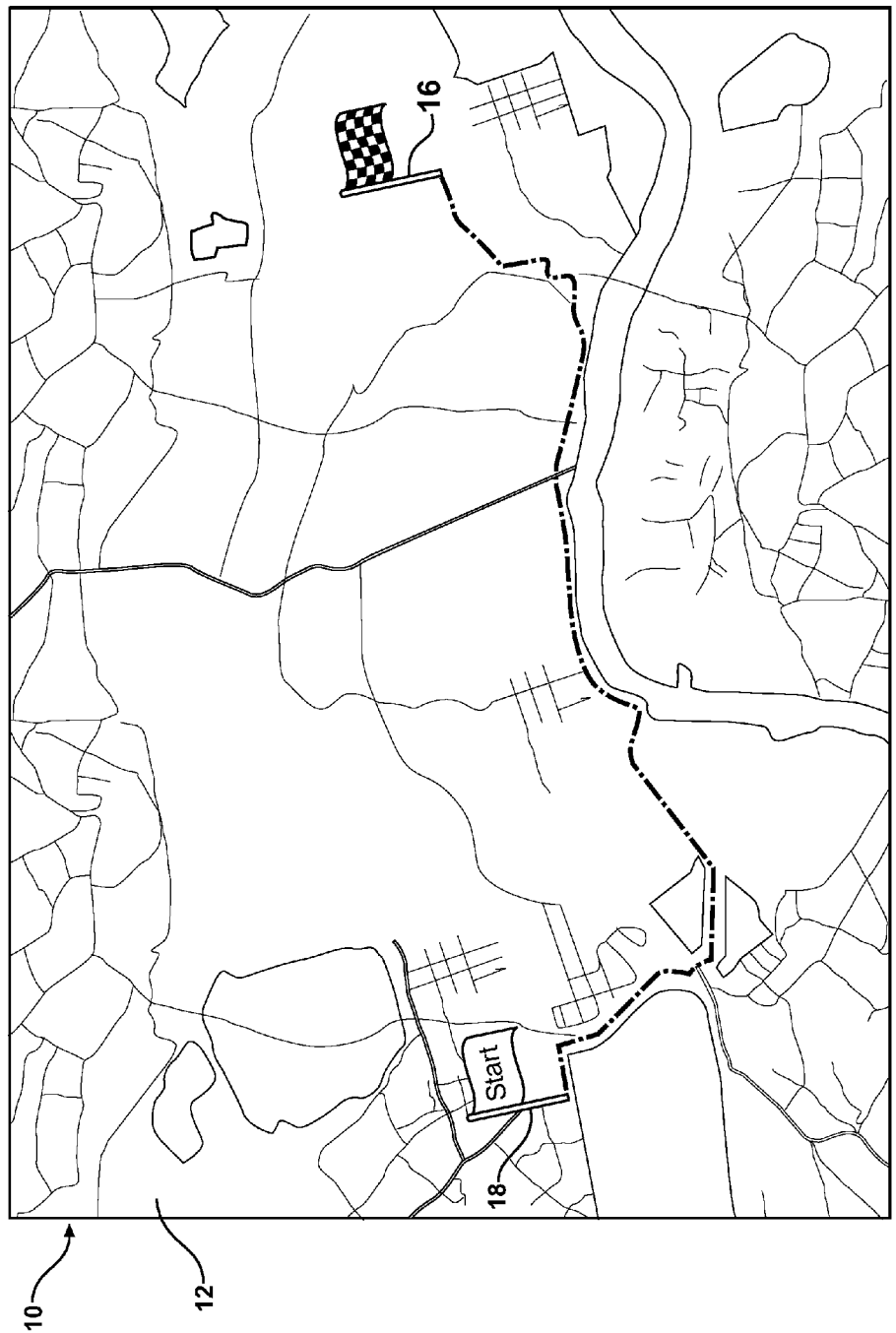
FIG. 2 is a simplified, bird's eye view of a portion of a road network in which a starting point and destination are indicated together with a planned travel route therebetween.
Figure 6:
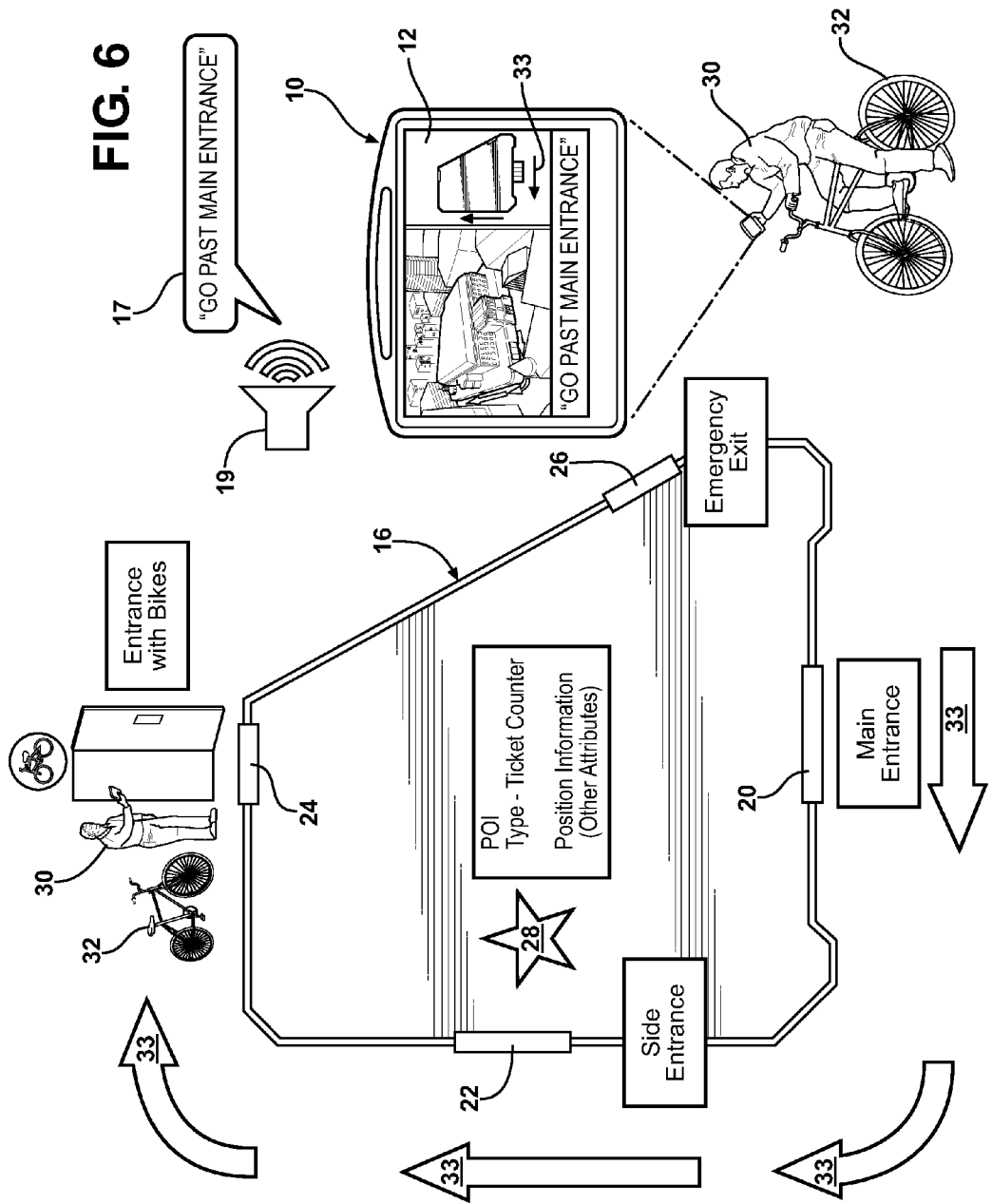
FIG. 6 is a view as in FIG. 5 depicting the functionality of this invention wherein the traveler, upon reaching the destination address, is further guided to a specific entrance portal with directional cues.
Figure 7:
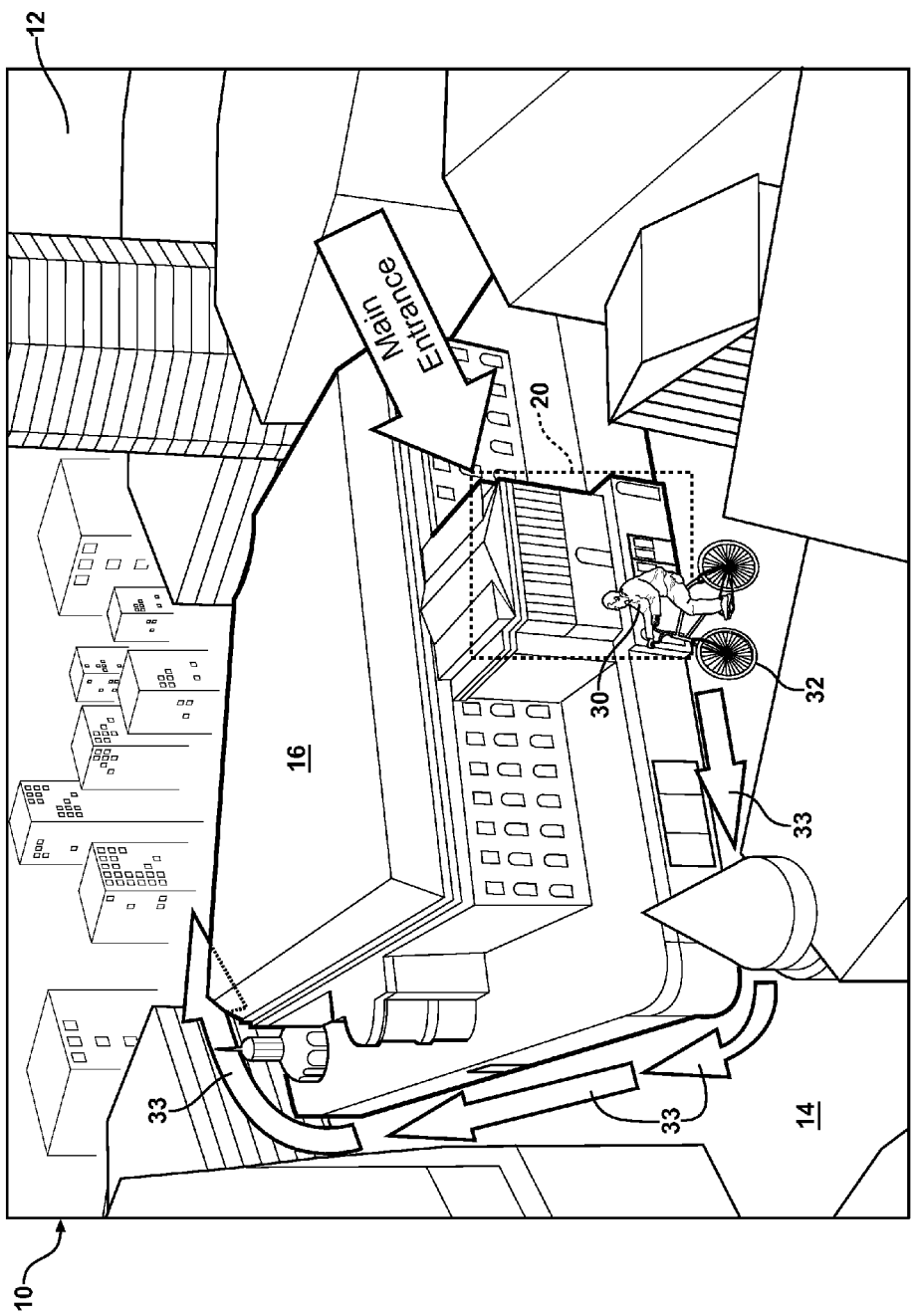
FIG. 7 is a view of the display screen of a personal navigation device as may appear when proximate the physical object, in which a 3D model of the physical object (a building in this example) is portrayed along with directional cues.

FIG. 6 shows a traveler 30 having arrived at the destination address 16 (in this example a train station) with a bicycle 32. The traveler 30 will have been navigated to the train station 16 by following directional cues associated exclusively with a digital map as shown for example in FIG. 1. Upon reaching the destination address 16, navigation converts to reference of a 3D model of the destination address 16, where the traveler 30 with bicycle 32 queries which entrance will enable him to enter with the bicycle 32. Having arrived at the correct address using the digital map, the 3D model of the building 16 is used to direct the traveler 30 via any relevant attributed features associated with the 3D model. For example, the navigation device 10 may direct the traveler 30 to proceed past the main entrance 20, where the main entrance 20 comprises an attributed feature of the 3D model. These instructions may be considered initial direction cues 33 associated with the 3D model, such as also shown in FIG. 7, which provide navigation references to attributed features recognizable on and around the exterior of the destination address 16. Further initial directional cues 33 may, in this example, instruct the traveler 30 to turn right at the end of the building, go to the end of the building, past the side entrance 22, and then turn right again. In approximately 50 meters (for example) on the traveler's right-hand side they will see a gate 24 to enter the train station 16 which has been meta-tagged as the appropriate entrance for bicycles 32.

Figure 10:
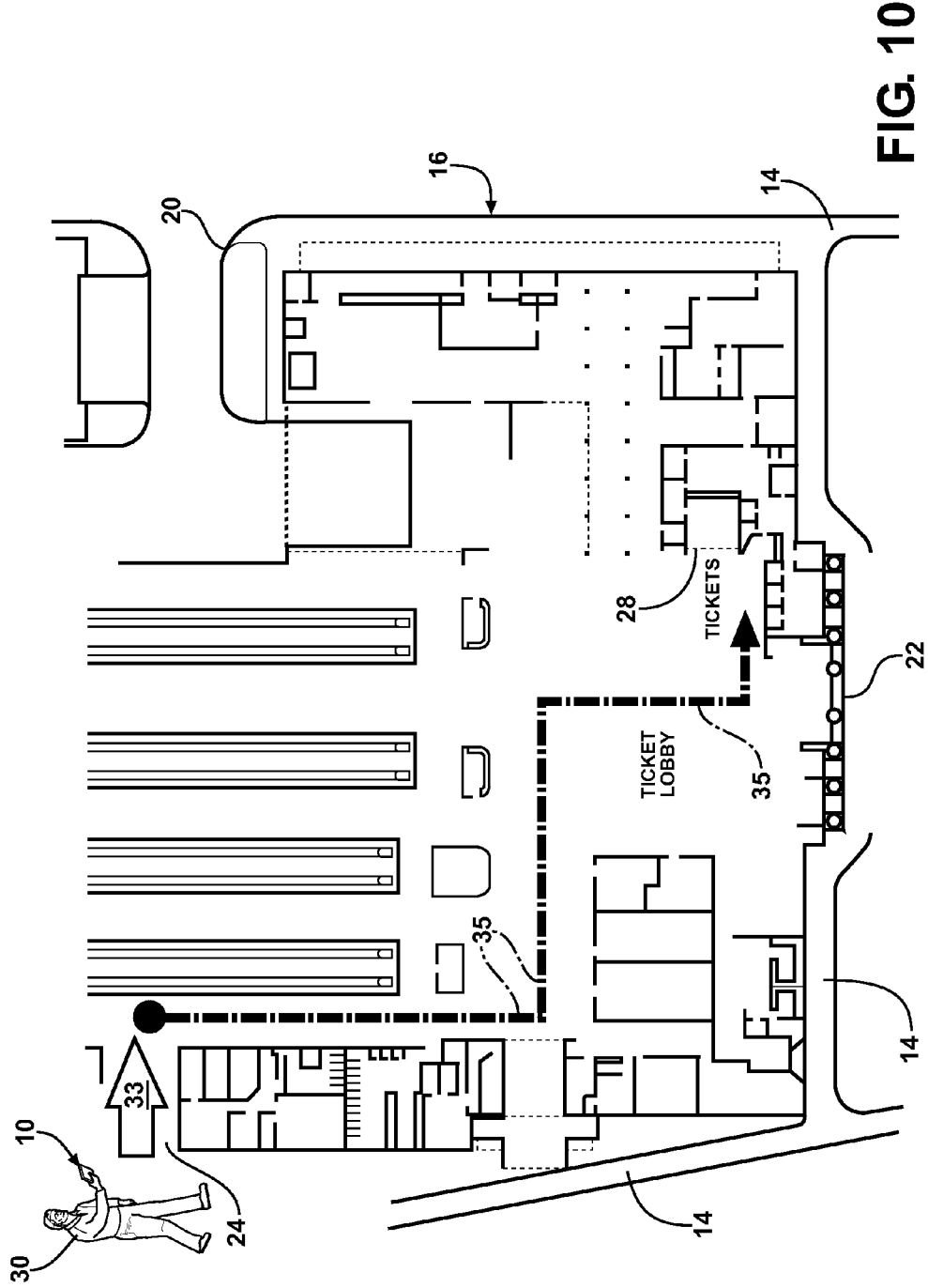
FIG. 10 is a map view of the building interior as may appear on a display screen of a navigation device according to this invention, wherein a traveler is provided final directional cues toward the interior feature POI from an exterior portal, i.e., the entrance to the structure.

Once the traveler's position reading device 10 generally coincides with the exterior portal POI 24, a further set of final direction cues 35 lead the traveler toward an interior feature POI 28, which in this example is the ultimate destination, as shown in FIG. 10. Final directional cues 35 are associated with POIs which can be discerned by the traveler 30 from inside the building. Of course, the direction cues 33, 35 may include attributes referencing non-visual elements as might be helpful to sight-impaired travelers, such as sound, smell or touch attributes. For example, an attributed feature may be an object that has a distinctive smell (such as restaurant that uses always curry spice) or a distinctive sound (such as clock shop from which can always be heard ticking sounds). By these steps, a traveler 30 is guided along a predetermined route in a digital map to an interior point of interest 28 inside a three-dimensional structure 16 in real life using a navigation device 10.

The method can be reversed so as to guide travelers inside the building to the closest emergency exit 26, for example. The navigation device 10 may be configured to inform the traveler 30 using visual cues such as the nearest emergency exit 26 can be found on the East wing on the right side of the wing. As most portable navigation devices 10 are fitted with a compass, the system may even be able to assist via the display 12 so that the traveler 30 does not need to orient themselves. A similar use case can be defined to find the best exit (exterior portal POI) to a certain street. Once the traveler 30 moves away from the building address 16, navigation via the 3D model ends and the digital map takes over the navigation function.

Preferably, building information, including the 3D navigation attributes described above, are stored on an appropriate storage medium together with the 3D model and not as part of a 2D attribute found in many prior art digital map applications. Thus, storing this 3D navigation information with the 3D building enables it to be shown on a 2D map and also on a 3D map, which will provide clear instructions and a suitable visual representation.

Figure 8:
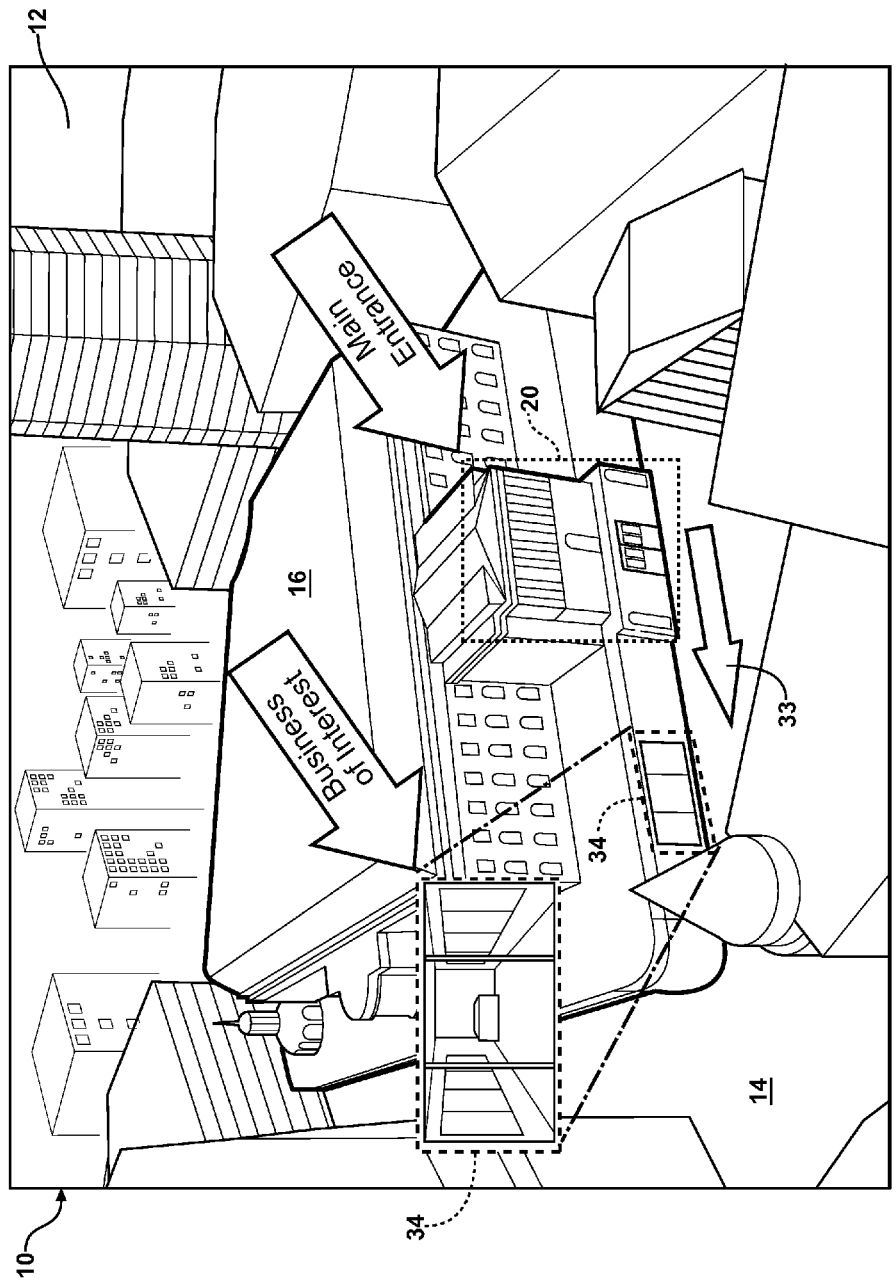
FIG. 8 is a view of a display screen of a navigation device according to the invention highlighting the main entrance and a business of interest which may serve as visual reference points in the navigation process.

Referring again to FIG. 7, the 3D visual representation of the physical destination 16 may include highlighting. For example, the highlighted main entrance 20 may serve as a visual reference or subtle cue for the benefit of the traveler 30. FIG. 8 illustrates the manner in which any remarkable building feature can be attributed as a POI and used for navigation assistance. In this case, a business of interest located at the exterior of building 16 is identified and attributed as an exterior feature POI 34. Such businesses of interest (or other POI details) can be used as visual navigation markers or reference points. For example, a traveler 30 located at the main entrance may receive an initial directional cue 33 as follows: "When passing the main entrance (20) you will see an Apple Store (34) after 15 meters on your right side." Of course, another use case would be that the business of interest 34 is the end destination and the traveler 30 is guided to that part of the building 16 where the selected POI 34 is located. This functionality will enable navigation applications by which a traveler 30 can reach an ultimate destination by selecting a part of a 3D model without knowing the exact address of the POI.

Figure 9:
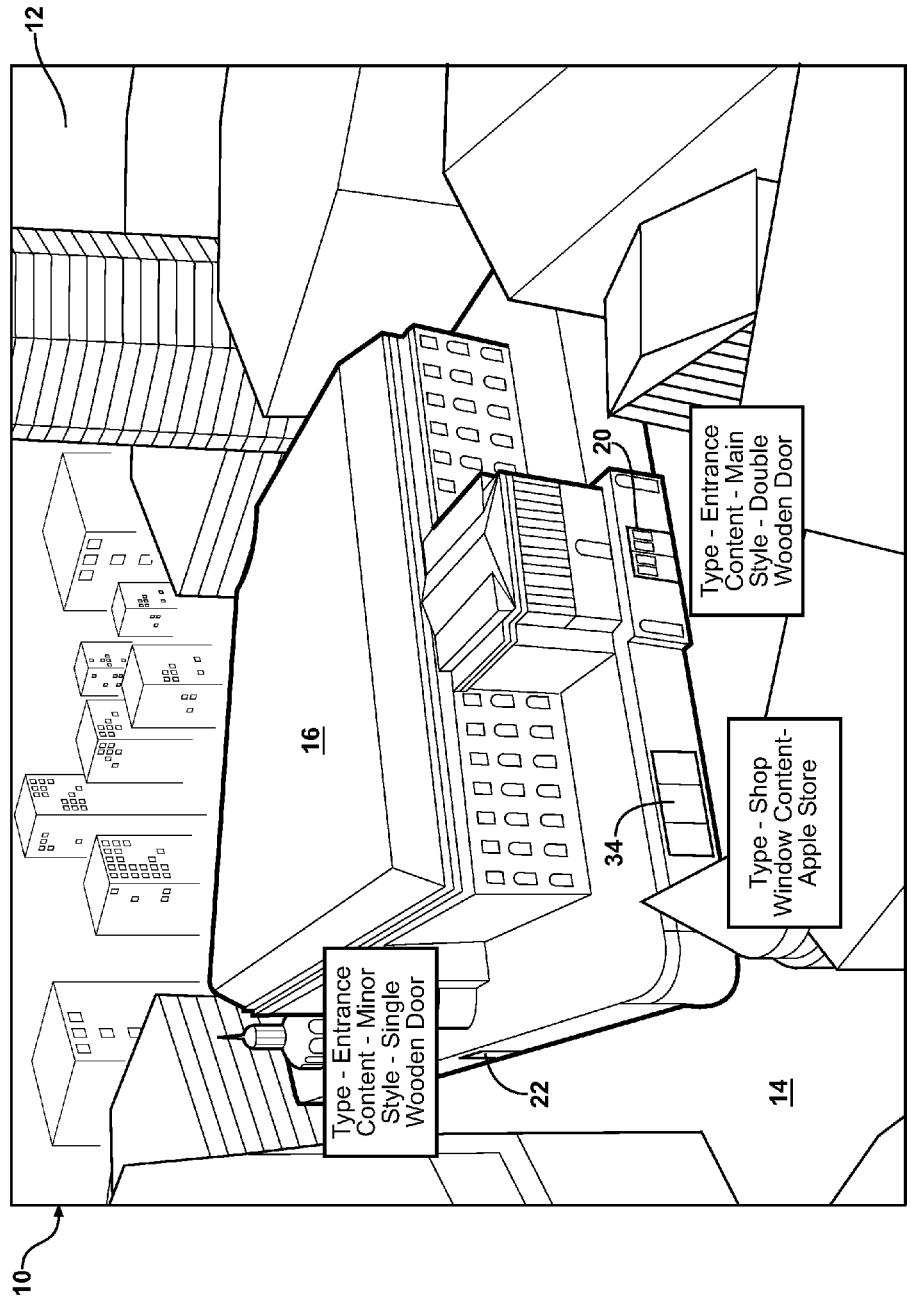
FIG. 9 is a view as in FIG. 8 but describing attribute types which may be associated with various points of interest (POIs)

FIG. 9 depicts some exemplary 3D navigation attributes associated with POIs 20, 22, 34 as described above. This concept enables descriptive information to be added as attributes for improving visual referencing during navigation and to enable augmented reality applications. Thus, a traveler 30 is provided with detailed navigation instructions which surpass the mere leading to a particular street address. Through the methods of this invention, a new kind of instructions, i.e., directional cues 33, 35, can be provided which more closely mimic natural language and normal human-to-human directional assistance. The visual cues 33, 35 may also be accompanied by audible cues 17. For example, travelers can be instructed to "pass the shop ahead on your left" or "pass the main entrance," etc., accompanied by 3D model renderings of building 16 which coincide with real life views. The methods of this invention further allow basic indoor navigation instructions to be given so that a traveler 30 can reach a destination inside the building, e.g., the POI 28. The methods can be further developed by modeling the inside of a building and using the exterior portal POIs 20-26 as connectors between outside navigation and inside navigation. In other words, a traveler 30 must pass through one of the exterior portal POIs 20-26 in order to gain access to the building interior. Thus, initial directional cues 33 lead a traveler 30 to an appropriate external portal POI, following which final directional cues 35 are given toward the interior feature POI representing the traveler's destination point. The portals 20-26 thus serve as junction points between the initial 33 and final 35 directional cues. By adding 3D navigation attributes to a 3D model, it becomes possible for communities of users to add information about particular buildings. In other words, qualified or approved users may add 3D navigation attributes to buildings which provide even greater destination choices for a traveler 30. If brought online, such updating could occur via an Internet community of users.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A method for guiding a traveler along a predetermined route in a digital map to a specific point of interest (POI) with respect to a three-dimensional structure in real life using a navigation device (10), said method comprising the steps of:
   providing a digitized 3D model (16) of a physical object in reality;
   providing a digital map having at least one road segment (14) corresponding to a road in reality leading to the 3D model (16);
   associating a plurality of spatially distinct points of interest (POIs 20-28) with the 3D model (16) corresponding to distinct locations distributed about the physical object in real life, wherein associating the plurality of spatially distinct POIs (20-28) comprises categorizing at least one POI as an exterior portal (20-26) and at least one POI as an interior feature (28);
providing a navigation device (10) interactive with the digital map and having a display screen (12); and
on selection by a user of one of the plurality of POIs (20-28) as a destination;
providing directional cues associated with the road segment (14) leading toward the 3D model (16) from the display screen (12) of the navigation device (10);
and, when proximate the physical object, portraying the 3D model (16) of the physical object on the display screen (12);
providing directional cues (33, 35) associated with the 3D model (16) leading toward the selected POI (28) on the display screen (12) of the navigation device (10), wherein if the selected POI is an interior feature (28), then navigating to the exterior portal (20-26) prior to providing directional cues (35) toward the selected POI (28).

2. The method of claim 1 wherein said step of providing directional cues includes rendering a directional arrow on the display screen (12).

3. The method of claim 1 wherein, the navigation device (10) includes a speaker (19), and said step of providing directional cues includes generating audible instructions (17) with the speaker (19).

4. The method of claim 1 wherein said step of associating a plurality of spatially distinct POIs (20-28) includes establishing the POIs as attributes of the 3D model (16) in the digital map.

5. The method of claim 1 wherein said step of associating a plurality of spatially distinct POIs (20-28) includes categorizing at least one POI as an exterior feature (34) distinct from the exterior portal (20-26) and interior feature (28).

6. The method of claim 1 wherein said step of categorizing at least one POI as an exterior portal includes defining an emergency exit (26).

7. A storage medium used to store 3D model (16) attributes for augmenting a digital map according to claim 1.

8. A method for guiding a traveler along a predetermined route in a digital map to an interior point of interest (POI) inside a three-dimensional structure in real life using a portable navigation device (10), said method comprising the steps of:
providing a digitized 3D model (16) of a physical object in reality having an address;
providing a digital map having at least one road segment (14) corresponding to a road in reality;
associating a plurality of spatially distinct points of interest (POIs 20-28) with the 3D model (16) corresponding to POIs in the physical object in real life, at least one POI comprising an exterior portal (20-26) and at least one POI comprising an interior feature (28);
providing a position reading device (10) interactive with the digital map and having a display screen (12), the position reading device (10) configured to ascertain its current position relative to the digital map and indicate the current position on the display screen (12); wherein on selection by a user of the interior feature POI (28) as a destination;
providing directional cues associated with the road segment toward the address of the physical object from the current position of the position reading device (10); and, when the position reading device (10) is proximate the address of the physical object, portraying the 3D model (16) of the physical object on the display screen (12); and providing initial directional cues (33) associated with the 3D model (16) toward the exterior portal POI (20-26), and then providing final directional cues (35) toward the interior feature POI (28) when the current position of the position reading device (10) generally coincides with the exterior portal POI (20-26).

9. The method of claim 8 wherein said step of providing initial (33) and final (35) directional cues includes rendering a directional arrow on the display screen (12).

10. The method of claim 8 wherein, the position reading device (10) includes a speaker (19), and said step of providing initial (33) and final (35) directional cues includes generating audible instructions (17) with the speaker (19).

11. A storage medium used to store 3D model (16) attributes for augmenting a digital map according to claim 8.

12. A navigation device (10) for guiding a traveler along a predetermined route in a digital map to a specific point of interest (POI) with respect to a three-dimensional structure, the navigation device comprising a display screen (12), and being interactive with;
a digitized 3D model (16) of a physical object, with which a plurality of spatially distinct points of interest (POIs 20-28) are associated, the POIs corresponding to distinct locations distributed about the physical object, wherein the plurality of spatially distinct POIs (20-28) are associated with the 3D model by means to categorize at least one POI as an exterior portal (20-26) and at least one POI as an interior feature (28);
and a digital map having at least one road segment (14) corresponding to a road leading to the 3D model (16);
wherein the navigation device comprises means to permit user selection of one of the plurality of POIs (20-28) as a destination, and, on selection of the POI, is configured to;
provide directional cues associated with the road segment (14) leading toward the 3D model (16) from the display screen (12) of the navigation device (10); and, when proximate the physical object, to portray the 3D model (16) of the physical object on the display screen (12) to provide directional cues (33, 35) associated with the 3D model (16) that lead toward the selected POI (28) on the display screen (12) of the navigation device (10), wherein, if the selected POI is an interior feature (28), the device (10) is configured to navigate directly to the exterior portal (20-26) prior to providing directional cues (35) toward the selected POI (28).

13. The device (10) of claim 12 wherein the means to provide directional cues comprises a directional arrow rendered on the display screen (12).

14. The device (10) of claim 12, further comprising a speaker (19), and means to provide directional cues in the form of audible instructions (17) via the speaker (19).

15. The device (10) of claim 12 wherein the plurality of spatially distinct POIs (20-28) are associated with the 3D model by means to establish the POIs (20-28) as attributes of the 3D model (16) in the digital map.

16. The device (10) of claim 12 wherein the plurality of spatially distinct POIs (20-28) are associated with the 3D model by means to categorize at least one POI as an exterior feature (34) distinct from the exterior portal (20-26) and interior feature (28).

17. The device (10) of claim 12 wherein means to categorize the at least one POI as an exterior portal includes means to define an emergency exit (26).

* * * * *